United States Patent [19]
Nucklos et al.

[11] 3,803,631
[45] Apr. 9, 1974

[54] SIGNAL ANALYZING APPARATUS FOR TIME SEQUENTIAL SIGNALS

[76] Inventors: James E. Nucklos, 502 Pease Dr., New Carlisle, Ohio 45344; Earl V. Eichenlaub, 10658 Haddix Rd., Rt. No. 1, Fairborn, Ohio 45324

[22] Filed: Apr. 9, 1973

[21] Appl. No.: 349,515

[52] U.S. Cl. .............................. 346/35, 346/107 R
[51] Int. Cl. ............................................. G01d 9/02
[58] Field of Search........ 346/33 R, 35, 107 R, 108; 179/100.1 VS; 324/77 C, 77 CS

[56] References Cited
UNITED STATES PATENTS

| | | | |
|---|---|---|---|
| 3,438,057 | 4/1969 | Neitzel | 346/107 R |
| 3,512,158 | 5/1970 | Scarbrough | 346/76 R |

Primary Examiner—Joseph W. Hatary

[57] ABSTRACT

A line scan recorder having light emitting diode printout on a manually velocity controlled light sensitive medium with sweep rate of the input signal both manually controlled and automatically synchronized with the input signal provides apparatus for analyzing the characteristics of unknown signals.

2 Claims, 11 Drawing Figures

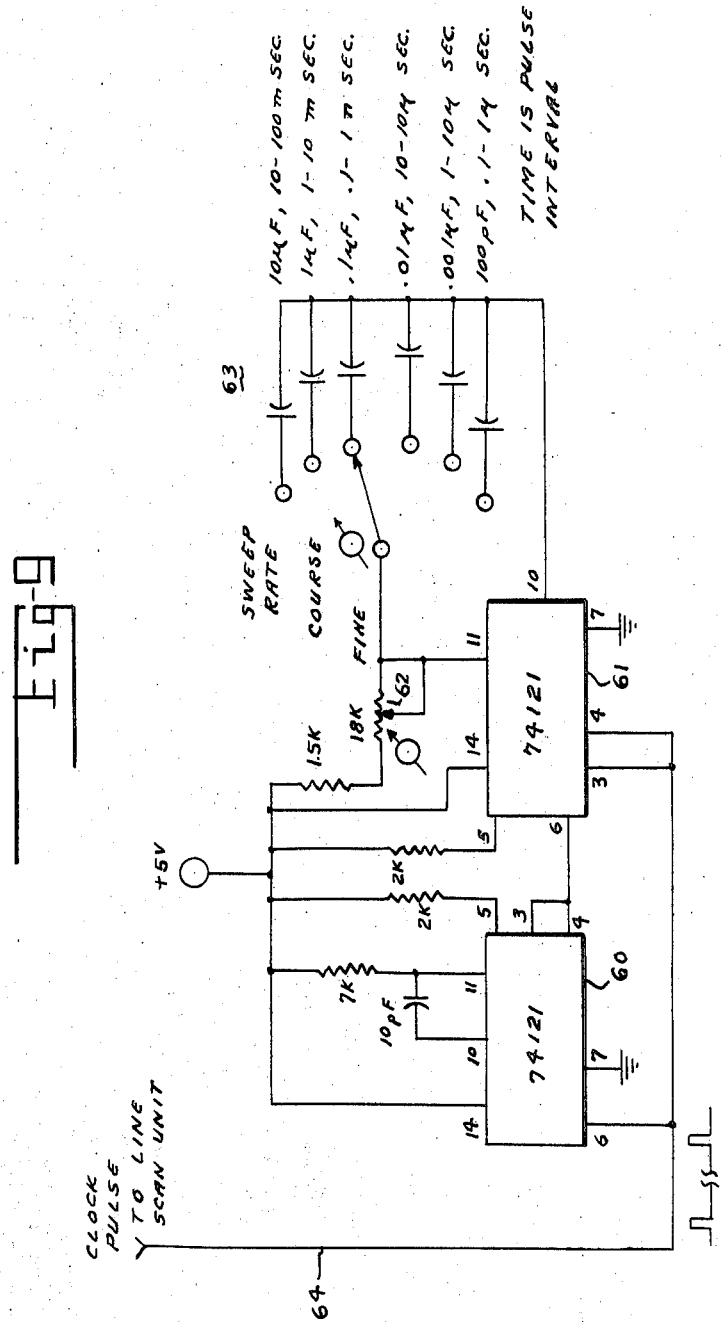

SIGNAL ANALYZING APPARATUS FOR TIME SEQUENTIAL SIGNALS

BACKGROUND OF THE INVENTION

The field of the invention is in electronic signal analyzing apparatus.

The search for intelligence bearing electromagnetic signals from outer space is well known. Sometimes what appear to be signals are detected. The next question is whether there is any information contained in them; is there a repetitive pattern, or a particular synchronization signal which will impart meaning to the other signals; can the apparently random signals be made to form a picture, or in the simplest terms, is there any intelligence that we can detect contained in the signals? Many times the signals are obscured in the noise, or perhaps what appears to be noise can be restructured to provide a pattern form which a meaning can be obtained. Quite frequently the question is, "is a signal present in the noise". The analysis of unknown signals from unfriendly sources is also well known in warfare.

Cathode ray tubes and mechanical oscillographs have been used in the past to attempt to analyze unknown signals. In general the mechanical devices do not have the stability, ruggedness, or versatility desired. Cathode ray vacuum tube devices are unsatisfactory without a permannet recording so that pattern changes with changes of parameters may be compared. In addition, cathode ray tube devices are fragile, expensive, and generally unsuited for airborne usage. An example of the best presently available apparatus that can be adapted for this use uses a cathode ray tube having fiber optics imbedded in the tube face plate for conducting the light from the phosphors in the tube to the recording medium. These cathode ray tubes having fiber optic face plates are very difficult to manufacture, expensive, and prone to develop vacuum leaks around the fiber optics, particularly when used in airborne installations.

SUMMARY OF THE INVENTION

A solid state electronic signal analyzing system that is rugged, stable, relatively inexpensive, versatile, and suitable for airborne usage is disclosed. The apparatus is suitable for real time analysis, i.e., concurrently with the reception of the unknown signals, or for use with previous made recordings of the electromagnetic radiation of unknown characteristics. The printout from the apparatus may either be on photographic film or on light sensitive paper.

BRIEF DESCRIPTION OF THE DRAWING

FIG. 8 is a detailed schematic diagram of one of the light emitting diode and switch assemblies shown in FIG. 7;

FIG. 9 is a detailed schematic diagram of the clock pulse generator shown in FIG. 8;

DESCRIPTION OF THE PREFERRED EMBODIMENT

Figure 1:
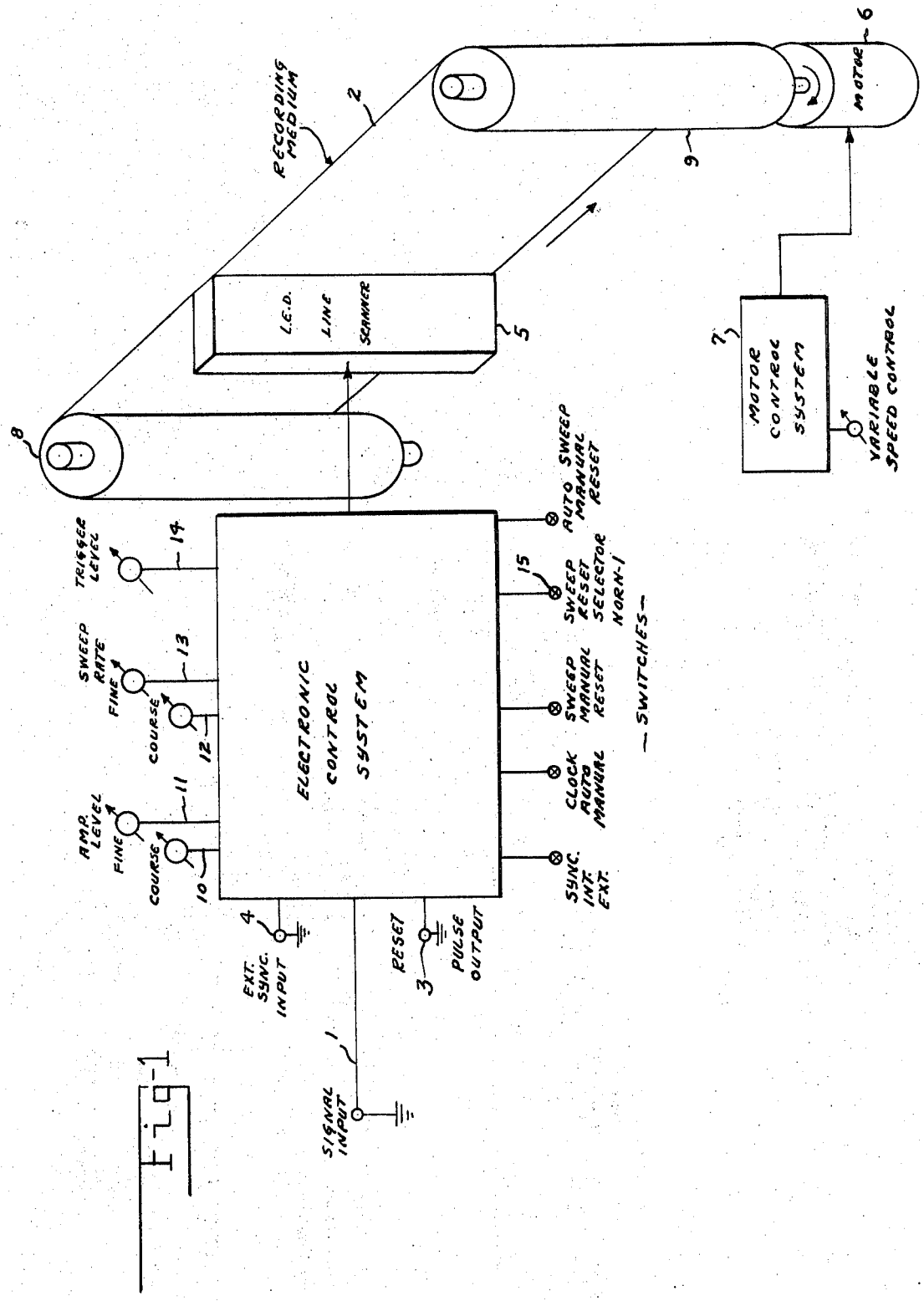
FIG. 1 is a simplified block-schematic diagram of an embodiment of the invention.

Referring to FIG. 1, a simplified block-pictorial representation of the invention, the signal input on line 1, commonly referred to as the video signal, is the unknown, amplitude varying, time sequential signal. It is obtained from conventional electromagnetic wave receiving apparatus. The electromagnetic wave that is detected by the receiving apparatus and provided as an amplitude varying time sequential signal to the apparatus of the invention may be an amplitude, a frequency, a pulse code, or a phase modulated wave. It may be a type of telemetry, facsimile, television, radar or other signal. It is an object of the invention through variations in the parameters of the apparatus of the invention to enable an operator of the apparatus to discern if the received electromagnetic wave contains any intelligence and be able to further break down the signal so as to extract the intelligence from it. The unknown signal on line 1 may be a real time signal, i.e., a signal as it is being received by the receiver, or it may be a recording of a signal received at some prior time. In some instances, particularly where the received unknown signal is of relatively short duration, it is desirable to make a recording of the unknown signal and "play" it through the apparatus of the invention many times while the operator changes scanning rates, amplitude levels, synchronization trigger levels, speed of the recording medium, all the while watching the recording to detect if a pattern is emerging. Typically, when the apparatus is first put in operation on an unknown signal the printout on the recording medium 2 may appear as a hopeless random configuration of dots and lines. By closer examination and by varying the controls of the apparatus the operator may discern an oblique line appearance in relation to certain dots of the recording, or a repetitive line formation. In other words, a pattern is starting to emerge on the printout of the apparatus and the unknown signal does in fact contain intelligence. Further manipulation of the levels and time bases of the system may then produce a definite pattern or even a picture. From this definite pattern, and knowing the parameters set in the apparatus of the invention by the operator, the synchronization pulses in the unknown signal may be ascertained as well as scan times, pulse code times, pulse repetition rates, frame time and the complete characteristics of the previously unknown time sequential signal.

The apparatus provides a reset pulse output signal 3 for synchronizing external auxiliary equipment, such as a conventional oscilloscope, with the sweep of the scanner. It also provides for an external synchronization signal input 4 so that the sweep of the scanner may be syncronized with a pulse that is extraneous to the signals on line 1. This extraneous pulse may be from another receiver receiving at a different position in the electromagnetic spectrum than the position from which the signals on line 1 are obtained, or it may be supplied by an external, more complex (coded) pulse generator. Obviously, this synchronizing pulse may also be a train of recorded signals played back into the apparatus as with the signals on line 1.

The recording medium 2 is conventional photographic film or light sensitive paper. Light sensitive "dry" paper such as Kodak Kind 1895 and "wet" film such as Kodak Kind 2083 are examples of suitable recording mediums. The photo-sensitive paper or film is moved by the line of light emitting diodes in the line scanner 5 by a conventional transport mechanism comprising the drive motor 6, the motor variable speed control system 7, the supply reel 8, and the takeup reel 9. The schematic representation in the drawing is shown in very simplified form. Generally the preferred drive for moving the paper is a conventional capstan type drive separate from the takeup reel so that the velocity of the medium by the scanner is independent of the amount of paper on the reels. Such tranpsort mechanisms are well known and nned not be further described. Likewise, it is to be understood that the photo-sensitive medium is held in contacting relationship with the surface of the light emitting diode array by a pressure pad or other conventional means. In some embodiments of the invention, fiber optic rods are used to conduct the light signals from a bank of light emitting diodes and form a printout line in contact with the recording medium.

The line scanner 5 contains a conventional assembly of a line of light emitting diodes positioned in a line at a right angle to the motion of the recording medium. Line assemblies of light emitting diode with emitting areas of 0.004 inches on 0.005 inch centers are well known and commercially available. Light emitting diodes are also readily available having various spectral characteristics, such as red, amber, and green. Obviously, it is desirable that the response characteristics of the recording medium 2 be compatible with the emission characteristics of the light emitting diodes. A suitable film (that requires developing before viewing) for red light emitting diodes is the previously mentioned Kodak Development Number 2083. A suitable light-sensitive paper for the higher frequency light sources, that does not require additional developing is the Kodak Number 1895 paper.

Amplitude changes (modulation) in the input signal on line 1 produces a Z axis (intensity) modulation in the recorded trace, or spot, on the recording medium 2. Thus, by adjusting the calibrated amplitude level controls 10 and 11 repetitive signals having approximately the same amplitude may be observed by their appearance at approximately the same position in the "gray" scale (i.e., intensity level). A particular embodiment of the invention has a line of 400 light emitting diodes occupying a line length of appproximately 10 cm. Paper speeds are variable from 0.1 cm/sec to 300 cm/sec in calibrated indications. The sweep rate controls 12 and 13 vary the scanning from 0.4 sec/cm to 4 $\mu$sec/cm in calibrated indications with a linearity of approximately 0.01 percent of full scale. The Z-axis modulation bandwidth is from DC to 3db down at 10 MHz. The acceptable input level is from 1 volt to 100 volts. The calibrated trigger level control 14 covers the range of the input level. The input impedance of this particular embodiment, which is further described in detail, is one megohm and 20 pf. The usable recording rate is approximately 10 meagabits per second. It is to be observed that in this apparatus that the time interval between scanning the last light emitting diode at one end of the line of diodes and the scanning of the diode at the opposite end of the line is the same as the time interval between any two adjacent diodes. This effectively makes a zero retrace time in the scanning process. This is a novel parameter of the invention. By setting the sweep reset selector switch 15 to the N−1 position the signal to first and last diodes (i.e., top and bottom diodes) is the same. Thus, there are no voids or breaks in the comparison of adjacent traces.

Figure 2:
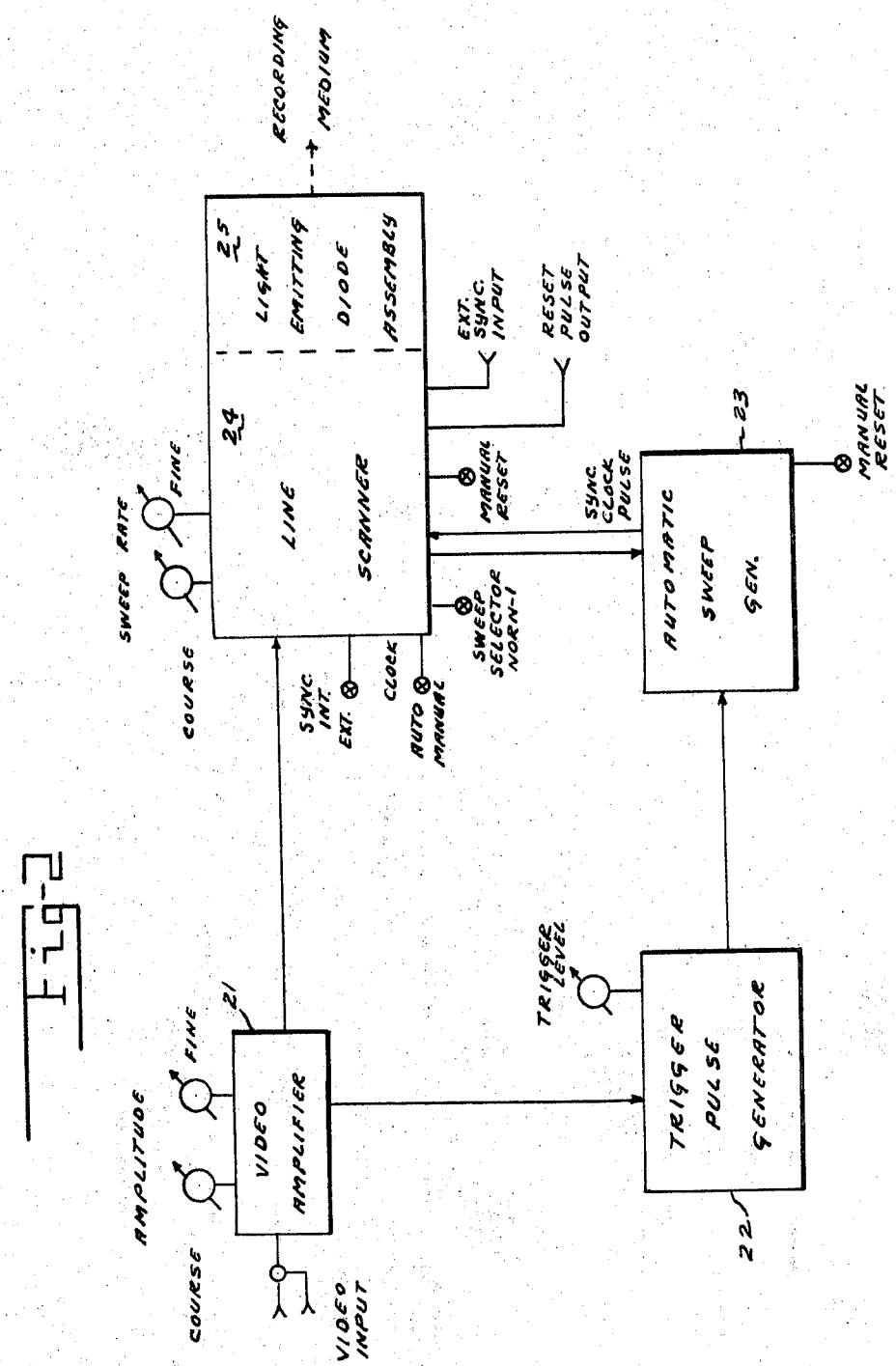
FIG. 2 is a simplified block-schematic diagram of the electronic control system and line scanner of FIG. 1.
Figure 3:
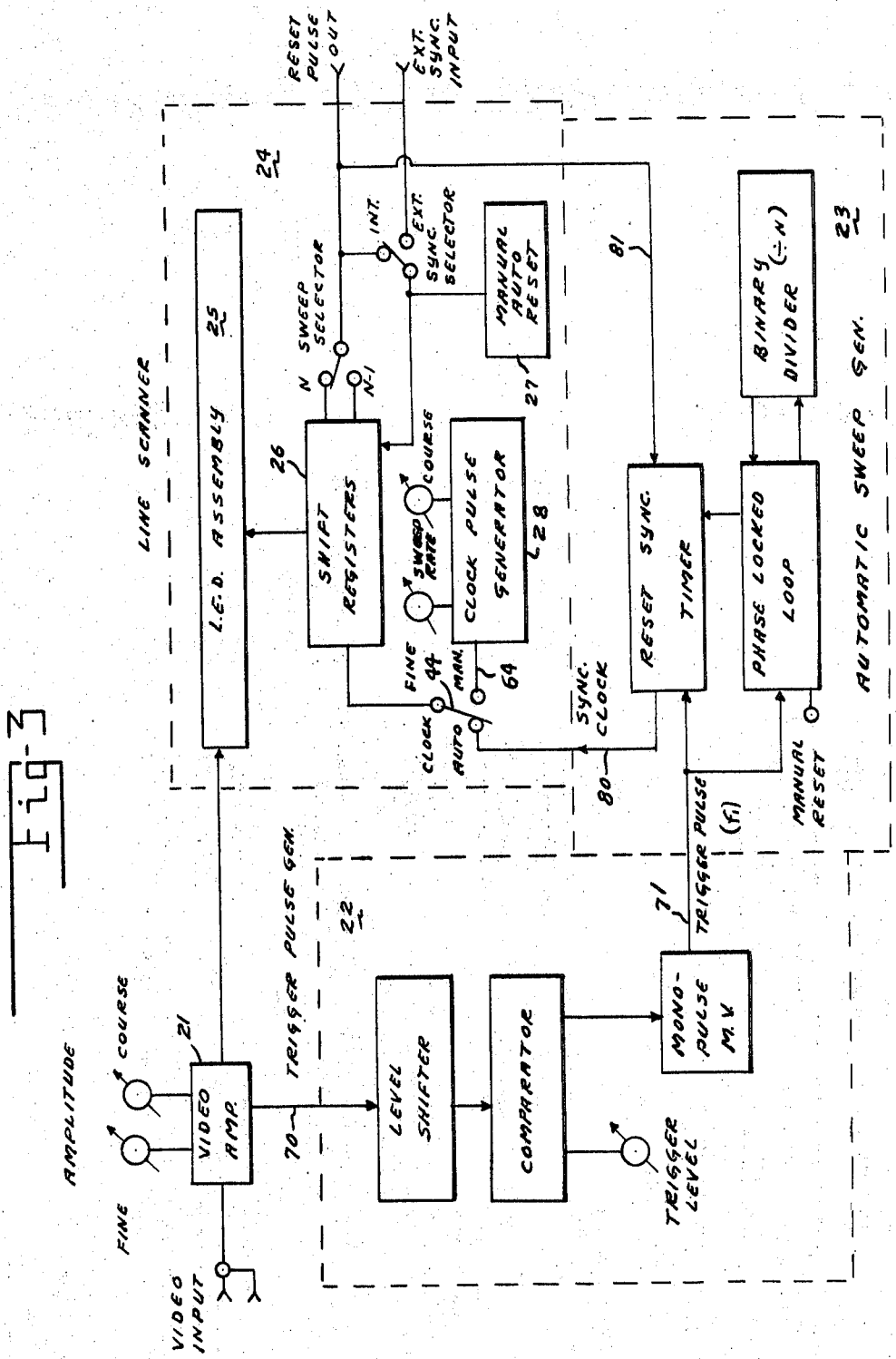
FIG. 3 is a more detailed block-schematic diagram of the electronic control system and line scanner.
Figure 10:
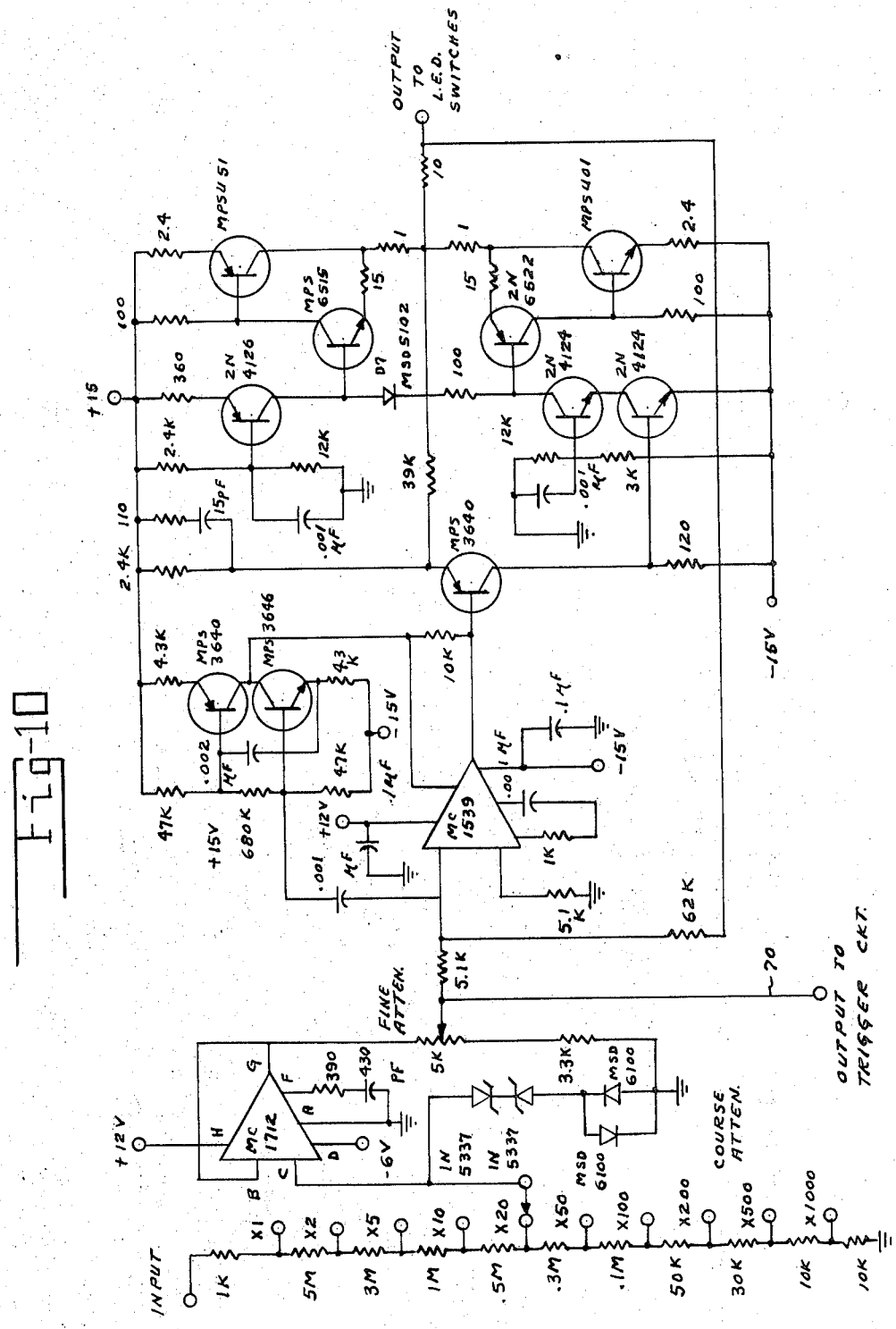
FIG. 10 is a detailed schematic diagram of the video amplifier shown in FIGS. 2 and 3.

A simplified block-schematic diagram of the major electronic systems of the invention is shown in FIg. 2. FIG. 3 shows the primary descriptive circuit functions within these systems. It is desirable that the video amplifier 21 have the capacity for providing peak output signals to the light emitting diodes of approximately 1 ampere. The relatively high current requirement is necessary for proper operation at the higher sweep rates and to compensate for losses in the switches and the square law resistance characteristics of the light emitting diodes. A suitable video amplifier which can supply currents up to 1 ampere at voltages up to 20 volts with a frequency response from DC to one megahertz is shown in detail in FIG. 10.

Figure 6:
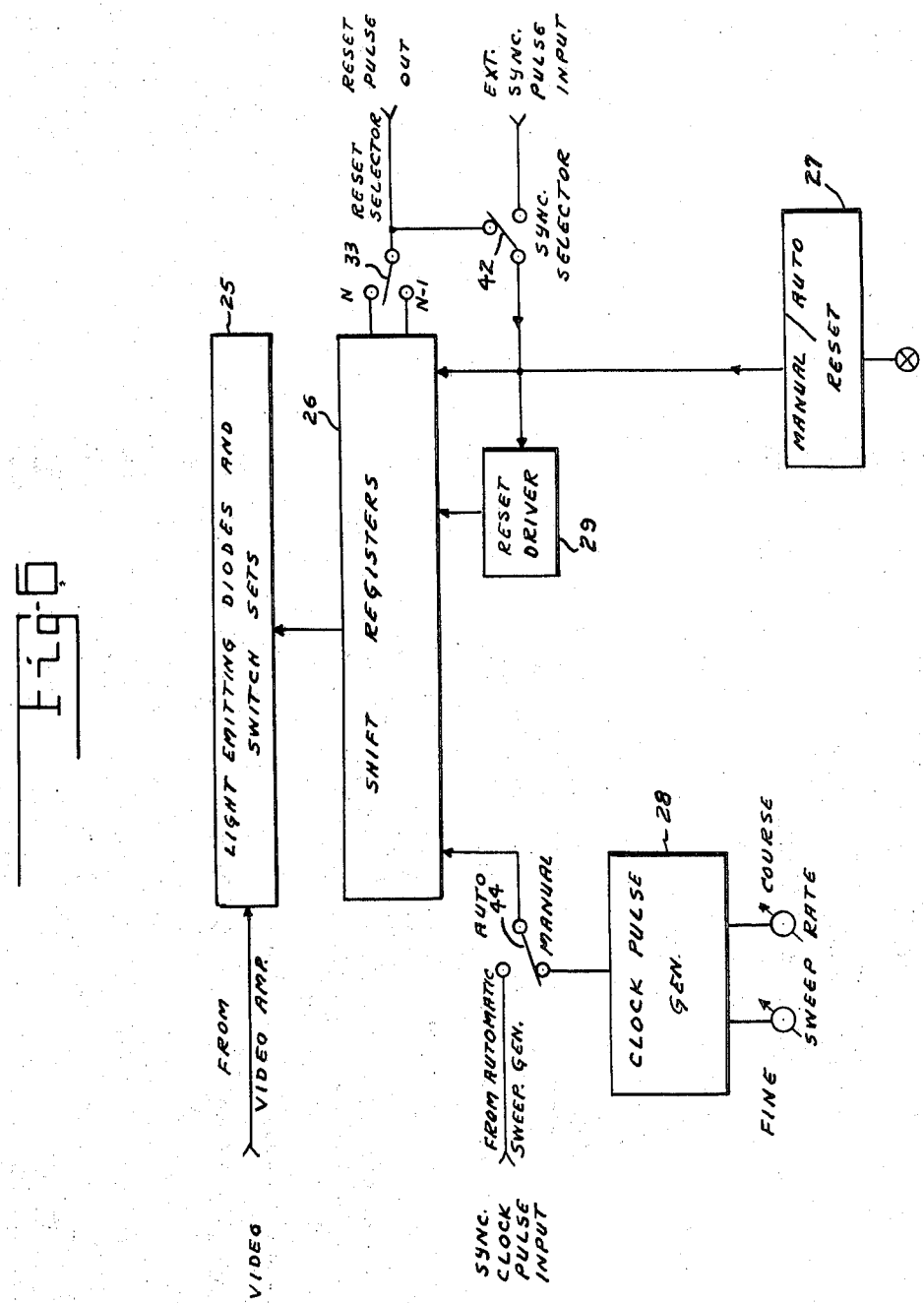
FIG. 6 is a more detailed block-schematic diagram of the line scanner shown in FIG. 3.
Figure 7:
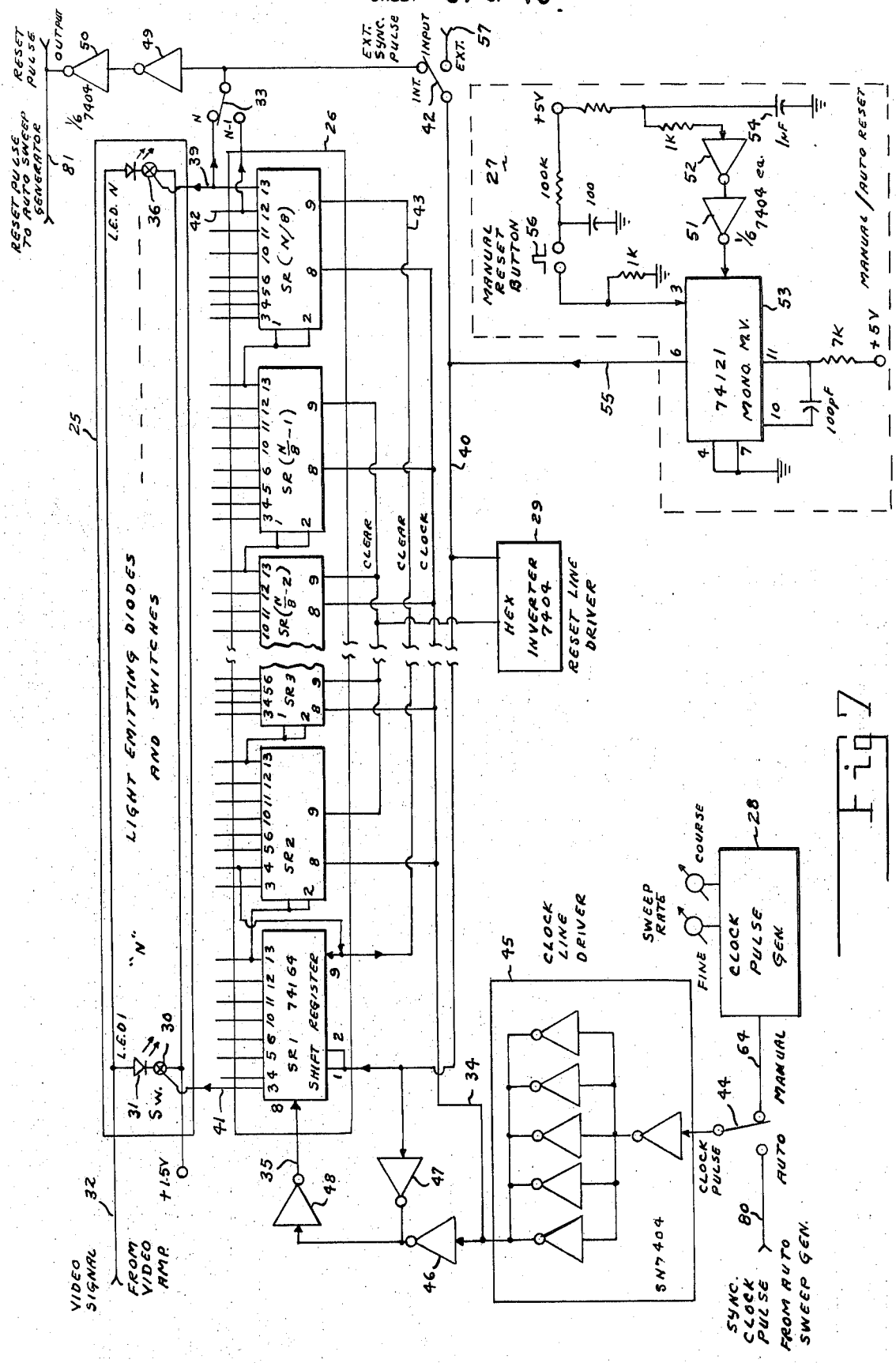
FIG. 7 is a schematic diagram of the line scanner shown in block form in FIG. 6.

The line scanner system 24, FIG. 3, is shown in block-function form in FIG. 6 and in component detail in FIG. 7. The clock pulse generator 28 is shown in detail in FIG. 9 and a typical switch 30 is shown in detail in FIG. 8. As previously stated, in a preferred embodiment of the invention, the light emitting diode assembly 25 is a line of 400 diodes. The number of diodes used in practicing the invention is not critical, thus in the drawing the total number is represented as N. The first light emitting diode 31 and each of the N light emitting diodes has associated with it a switch assembly 30 as detailed in FIG. 8. The particular embodiment being described in detail has 400 diodes and thus 400 switches. The video signal on line 32 is fed simultaneously to all the diodes but the only diode that can respond to the video signal is the one in which has its switch turned ON by a pulse from the shift register assembly 26. The shift register assembly 26 is composed of typical solid state, integrated circuit, eight bit shift registers. Since each eight-bit register controls eight diodes, N/8, eight-bit registers are required. That is, 50 for this particular embodiment where N is 400. Since only one pulse from the shift register will be present in the entire chain of pulses at any one time (except when switch 33 is in the N−1 position for duplicating the signal on the first and last diodes), only one diode will be presenting the video signal at any one time. The pulses from the shift register will sweep along the 400 outputs one step at a time thus scanning the line of light emitting diodes with the video signal in accord with the clock pulses supplied to the shift register assembly on lines 34 and 35. A suitable solid state eight-bit shift register commercially available is the type 74164.

The switches associated with each light emitting diode, i.e., the first switch 30, through the last or Nth switch 36, must be capable of switching the one ampere output from the video amplifier. They must also be capable of switching at a relatively high rate, preferably a decade higher than one-fortieth of the maximum scanning rate. A suitable switch circuit is shown in FIG. 8. The type 2N4401 transistor 37 is an example of a suitable switching transistor. To keep the coupling capacitance low a dual diode assembly, such as a type MSD 6100, is connected in series with the transistor, with each of the diodes in the diode pair connected in parallel. The normal low (OFF) voltage from the shift register may be as high as 0.5 volts, and the high voltage (ON), will be between 4 to 4.5 volts. To prevent excessive base current in the transistor 37 and to assure full cutoff when in the off state, the transistor emitter is connected to a +1.5 volt bus 38. This results in approximately a −1 volt bias on the base of the transistor in the off condition, and approximately a +3 volt signal in on condition. The +3 volt on signal will assure a full saturation condition for the transistor during the on condition.

To further explain the operation of the shift register assembly 26, when the last (Nth) light emitting diode is turned on by a pulse on line 39 from the last register in the chain activating switch 36, it (the Nth or last diode) prints the video signal then present on the recording medium. With switch 33 on the N position the same pulse activating switch 36 is fed back to the first register on line 40 continuing the sweep scanning the diodes with zero retrace time. That is the pulse on line 41 activating the first light emitting diodes follows immediately after the pulse turning on the last light emitting diode. (This is assuming that the external sync. pulse switch 42 is placed in the "internal" position rather than in the ext. position.) With switch 33 in the N−1 position the scanning sweep is started from the next to the last output 42 (the 399th in the particular embodiment being described) which produces an overlap in the presentation with duplicate signals recorded from the first and the last light emitting diodes. (In this embodiment the first and the 400th.)

To assure the condition that there is only one pulse in the chain at any one time (except for the overlap display), the chain is reset to zero after each sweep. Since a pulse is present continually, the first module SR1 is reset separately. It is reset by the second bit of the second module SR2. The second bit is used to provide a slight delay after the pulse has left the first module. The other shift register modules from the second to and including the next to the last, that is, SR (N/8 − 1) are all reset simultaneously when the pulse leaves the last bit in the chain. To prevent turning off the last bit when the overlap presentation is used (i.e., switch 33 in the N−1 position), the last module SR N/8 is reset simultaneously with the first module. (That is by the pulse on line 43).

The sequential activation of the light emitting diodes is produced by the parallel output shift register assembly 26 acting through the power switches in the light emitting diode and switch assembly 25. There is one bit of the shift register and one switch for each light emitting diode. Only the first and last diodes and switches are shown in the drawing for simplicity. The shift register assembly 26 is operated by inserting one "signal" pulse, that is a pulse on line 40, and then sending the pulse through the shift register assembly with a series of clock pulses. With an embodiment having 400 light emitting diodes, 400 clock pulses are required to produce one sweep along the scan line. The clock pulses are obtained either from the manually controlled clock pulse generator 28 or from the automatic sweep generator 23 (FIG. 3) according to the positioning of switch 44.

The clock line driver 45 is a conventional amplifier. In the preferred embodiment of the invention it is comprised of a solid-state integrated microcircuit. The output power capability of a conventional microcircuit is limited to, with the conventional TTL type of circuitry, 10 inputs. With 50 units of shift register modules to drive, five driving microcircuit amplifiers are required. Thus, the conventional type SN 7404 "Hex Inverter" is used for the clock line driver 45 with one of the amplifiers in the module used to drive the other five in parallel. (Note that no inversion of the signal then takes place.) The reset line driver 29 is also preferably composed of a conventional hex inverter module such as the type 7404 connected like the clock line driver 45. The other inverter amplifiers, 46 through 52, are all preferably 1/6 sections of a conventional microcircuit module such as the type 7404.

A special circuit is required to enter a pulse when the power supply is first turned on and to manually reset the system. This is the manual/auto reset circuitry 27. The monostable multivibrator 53, which may preferably be a conventional type 74121, is triggered through the inverter amplifiers 51 and 52 by the charging of the 1µf capacitor 54. This results in a pulse delayed from the time of power supply turn on. The signal from the 1µf capacitor 54 is sharpened by the two cascoded hex inverter amplifiers 51 and 52. The output from the monostable multivibrator 53 drives the reset bus line 40 to the first shift register module signal input; the reset line driver 29 which drives the reset, or clear, signal to the second through the next to the last shift register modules; and through the two inverters 47 and 48 the first shift register module to insure the entry of the first pulse into the shift register assembly. The reset pulse on line 55 from the monostable multivibrator connects to the same line 40 which carries the last (or next to last, if selected) pulse from the shift register chain, or the external synchronization pulse when switch 42 is in position "ext". The reset signal is also amplified by amplifiers 49 and 50 and provided as an output signal for the synchronization of any auxiliary equipment that it is desired to be used with the apparatus of the invention. The three hex inverter sections 46, 47, and 48 function as an OR gate to the clock signals from the clock line driver 45 and the reset signals on line 40. The manually actuated push button 56 provides for manually restarting the scanning sweep when desired. It also provides for a single scanning sweep, at a manually set rate when switch 44 is in the "manual" position and switch 42 is on the external position and no external signals are connected to jack 57.

The clock pulse generator 28 is further detailed in FIG. 9. Two conventional monostable multivibrator integrated circuit elements 60 and 61, such as type 74121, are connected to provide a variable rate pulse generator with a fixed output pulse length of 50 microseconds. The variable resistor 62 and the set of capacitors 63 provide a clock rate range of 0.1 milliseconds to 10 microseconds. This provides a sweep range of 0.25 Hz or one sweep per four seconds to 25 KHz or 25,000 sweeps per second. These ranges are considered suitable for most usages of the invention, however, those skilled in the art will readily provide other sweep ranges for particular applications. (To compare this sweep with typical conventional cathode ray oscilloscopes, with the 400 light emitting diodes spread over a distance of 10 cm, the sweep times would be 0.4 seconds per cm and 4 μsec per cm.)

Figure 5:
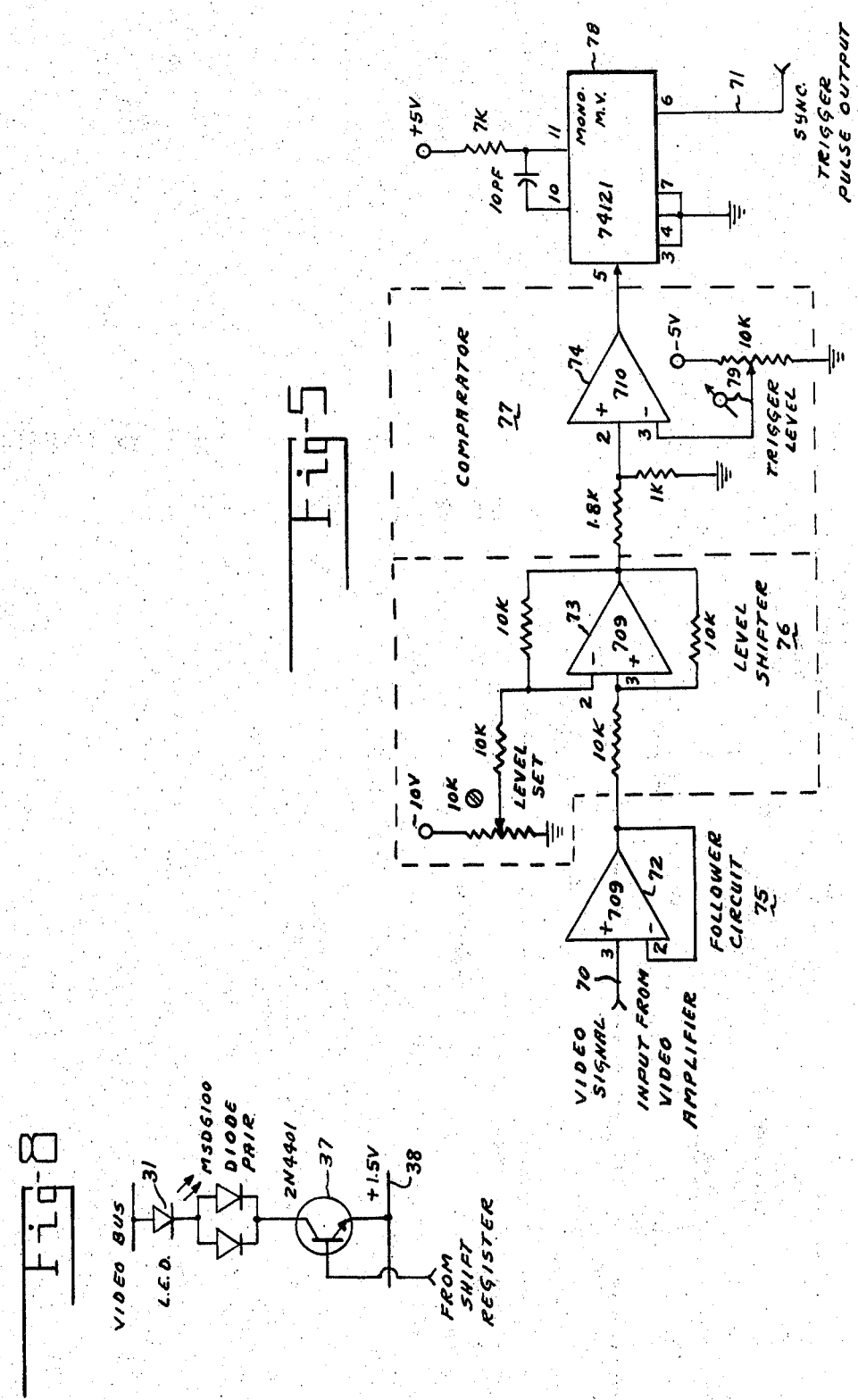
FIG. 5 is a detailed schematic diagram of the trigger pulse generator shown in FIG. 3.

Referring back to the detailed block-schematic diagram of the invention as shown in FIG. 3, the trigger pulse generator 22 receives the composit video signal on line 70 from the video amplifier 21. (Also shown in FIG. 10.) The trigger pulse generator supplies the trigger pulse on line 71 to the automatic sweep generator system (yet to be described). The trigger pulse generator provides for the manual selecting of an amplitude of signal level that will trigger the automatic sweep generator which then determines the scanning sweep rate when automatic sweeping from a signal level of the video signal is used rather than a manually set scanning rate. That is, when switch 44 is placed in the "auto" position. The trigger pulse generator 22 is shown in detail in FIG. 5. Again, the preferred embodiment is constructed using microcircuit components. Operational amplifiers 72 and 73 may suitably be conventional type 709 operational amplifier modules. The operational amplifier 74 may be the conventional type 710 comparator operational amplifier. The conventional follower circuit 75 is used to provide isolation. The level shifter 76 is used to remove + and − ambiguities by placing all signals in the same polarity relationship with reference a determined voltage. The comparator circuit 77 provides an output signal to the monostable multivibrator 78 whenever a representative video signal occurs at the setting of the manually adjustable trigger level control 79. The monostable multivibrator 78 is used to "square-up" and make uniform the sync. trigger pulses going on line 71 to the automatic sweep generator. A type 74121 integrated circuit module is a suitable component in the monostable multivibrator circuit.

Figure 4:
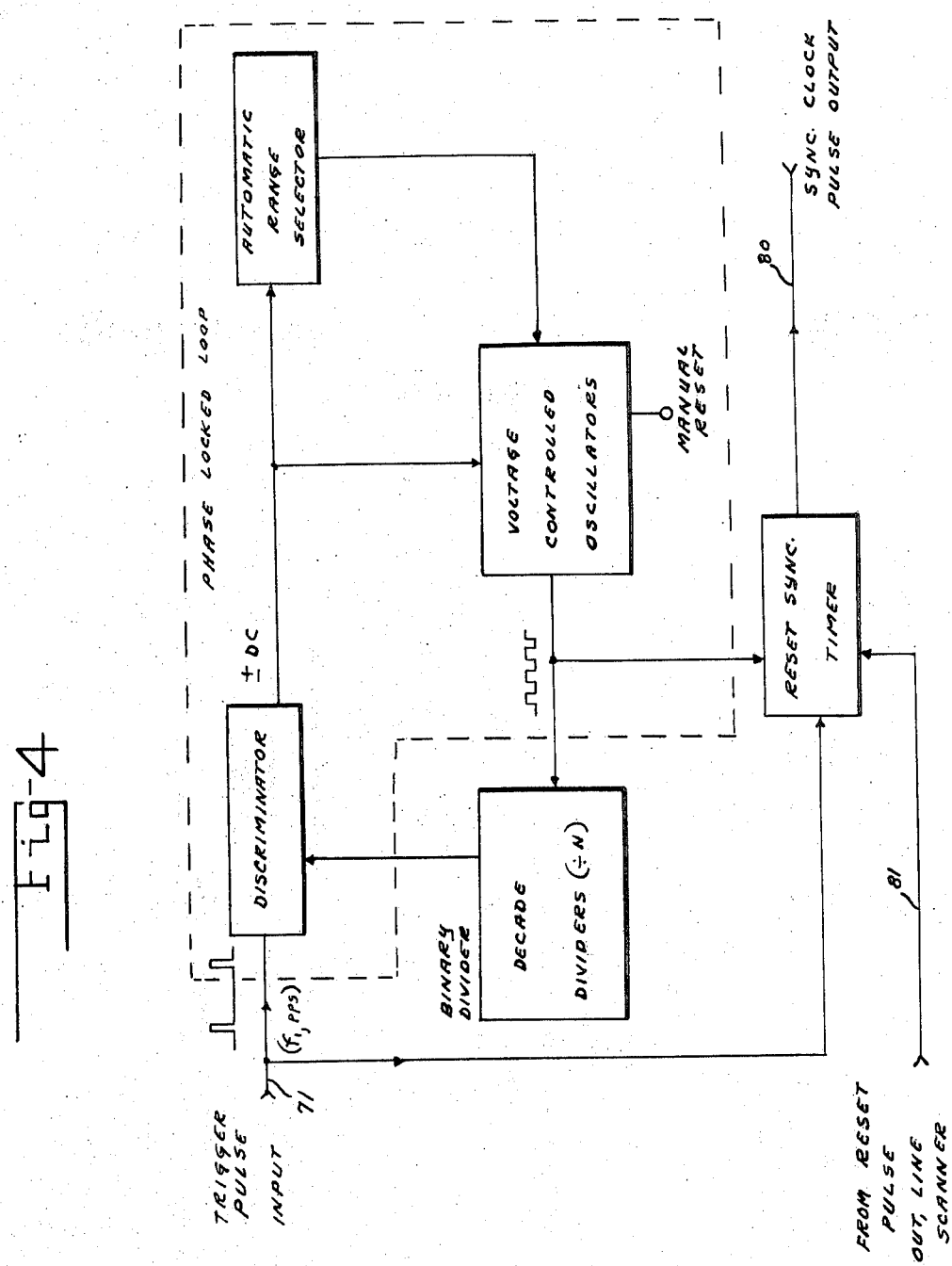
FIG. 4 is a more detailed block-schematic diagram of the automatic sweep generator shown in FIG. 3.

The remaining system component of the invention yet to be described is the automatic sweep generator system 23 of FIG. 3. This system synchronizes the scanning of the light emitting diodes to the selected signal component of the composite video signal. The automatic sweep generator 23 of FIG. 3 is shown more detailed block form in FIG. 4, and in detailed block-schematic-logic form in FIG. 11. The pulse output on line 80 to the clock line driver (45, FIG. 7) is exactly N (the number of light emitting diodes) times the pulse repetition rate of the input trigger signal on line 71 so that one sweep of the light emitting diodes will occur for each input trigger pulse.

Figure 11:
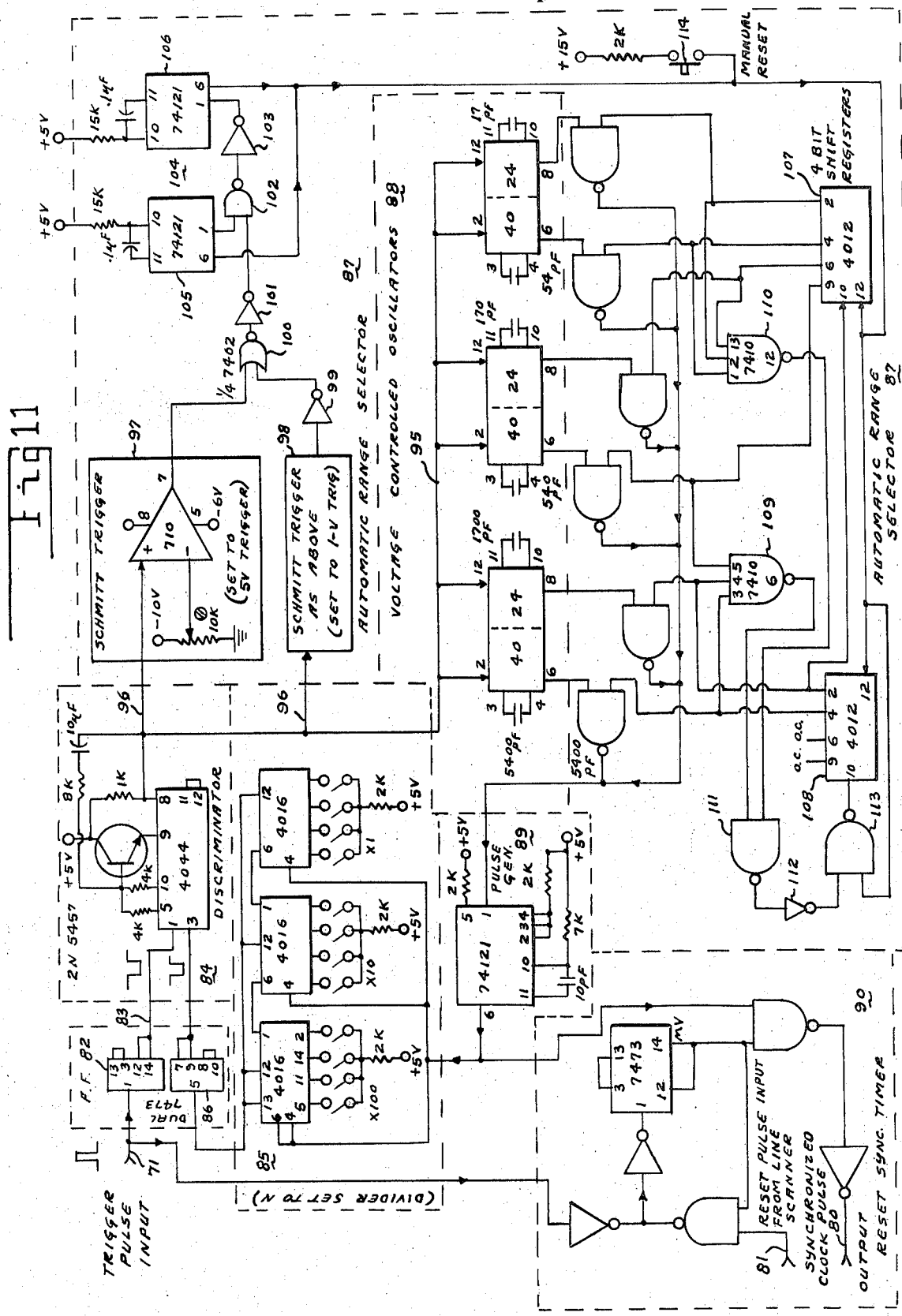
FIG. 11 is a detailed logic-schematic diagram of the automatic sweep generator shown in FIG. 4.

The basic operation of the automatic sweep generator, FIG. 11 is as follows. The trigger pulse input on line 71 is fed into a bi-stable multivibrator 82 which provides a square wave output on line 83 which is one-half the trigger pulse rate. This square wave is fed into the discriminator 84 along with the output of the programmable decade divider 85 after also being divided by the bistable multivibrator 86. The discriminator 84 has a DC output which controls the voltage controlled oscillators 88. The output pulses of the voltage controlled oscillators 88 (as they are controlled by the automatic range selector 87), are shaped (squared) in the monostable pulse generator 89 and fed into the divider 85. The discriminator will adjust the DC output to cause the voltage controlled oscillators to provide a square wave at a rate which when divided by N and then by 2 (in flip-flop 86) that is exactly equal in phase with the square wave from the flip-flop 82 which is half the frequency of the trigger input signal. The N pulses per scanning sweep from the pulse generator 89 are synchronized with the reset pulses from the line scanner by the reset sync. timer 90 and provided on line 80 as clock pulses (through the clock line driver) for the shift register assembly.

A more detailed operation of the voltage controlled oscillator loop is as follows. The required frequency range for the preferred embodiment of the invention is 20 KHz to 10 MHz, a range of 500 to 1. The tuning range of a conventional voltage controlled oscillator using a conventional dual voltage controlled multivibrator integrated circuit module such as the type 4024 is limited to a 3.5 to 1 tuning range. Thus, six voltage controlled oscillators are connected to cover the above range with the correct voltage controlled oscillator automatically connected to the output pulse generator in the following manner. The full range is divided into six ranges of 2.82 times for each range as follows: first range 17–60 KHz, second range 47.5 to 166 KHz, third range 135 to 470 KHz, fourth range 380 to 1,340 KHz, fifth range 1.15 to 4.0 MHz, and sixth range 3.0 to 10.5 MHz. It is to be noted that each range adequately overlaps the next and that the full range is slightly more than required. All of the oscillator inputs are connected in parallel from the discriminator by line 95. The DC range to control the oscillators will vary from approximately 2 to 4 volts. Thus, if any one oscillator cannot provide the correct frequency, the discriminator output will go to an extreme range to try to get the correct output. The DC output from the discriminator, line 96, is also connected to two Schmitt triggers 97 and 98 whose inputs are set for −5 volts and 01 volt. Thus, they will produce a trigger pulse at approximately a five volt DC level and a one volt DC level respectively. The output of the low level unit 98 is inverted by inverter 99 (one section of a type 7404, typically), so that if the operation is normal (i.e., within the 1 to 5 volt range), no signal is produced by the Schmitt trigger(s). But, if the DC level goes either high (over 5 V) or low (below 1 V), then the respective Schmitt trigger will switch producing a high output. This output signal is fed through NOR gate 100, inverted in inverter 101, and into an inverted NAND gate and additional inverter 103 to turn on the multivibrator 104 composed of two monostable multivibrator modules 105 and 106 (such as type numbers 74121). The output frequency of the multivibrator 104 is a fixed frequency of about 1 KHz. This frequency is not critical.

The 1 KHz square wave from multivibrator 104 is fed into two four-bit shift registers 107 and 108 which functions to provide a clock signal. A signal pulse, i.e., one single pulse, is caused to be entered to the voltage controlled oscillator circuitry, if no pulse is present, by the set of gates composed of a dual three-input NAND gate (109 and 110) and a single two-input NAND gate 111 followed by the inverter 112. If all six inputs are zero then the inverter output operates NAND gate 113 to allow one clock pulse to be entered into the shift register 108. With the entry of this pulse, the first output is activated, but note that neither the first or second outputs are connected. The clock pulse will continue stepping the shift register until one of the NAND gates open allowing a voltage controlled oscillator signal to enter the programmable divider chain 85, through the pulse generator 89. Once the correct frequency is found the discriminator will cause the voltage controlled oscillator to remain in synchronization with the trigger input signal. It is to be observed that it is possible for a harmonic of the desired frequency to lock in. A manually activated switch 114 is provided so that in the rare instance when this happens, the switch may be pushed to cause the shift register to go back to zero, and the automatic search for the correct frequency re-initiated. In the automatic search the first locking frequency is the correct one. It is only when for some reason that this frequency is missed that the apparatus may continue the search and lock on a harmonic.

The programmable divider 85 has three identical solid state units, such as type 4016. Each unit has a four-pole switch, settable to ten positions to provide a conventional binary output from the four poles representing the decimal inputs from zero to nine. (The switch may be a conventional four-pole ten-position rotary switch conventionally wired to produce the binary output.) Each of the programmable dividers represents a decade, one for units, one for tens, and one for hundreds. Thus, any division ratio can be chosen from one to 999. For this particular embodiment being described which has 400 light emitting diodes this is suitable. In fact, this divider may be used with up to 1000 light emitting diodes. Obviously, for embodiments of the invention that are to be operated with a fixed number of light emitting diodes always used, the switches in the programmable divider may be eliminated and the divider terminals directly wired for that division ratio. (Of course, those practicing this invention will readily modify the apparatus in accord with the teaching contained herein for other emgodiments of the invention having a larger number, or a smaller number of light emitting diodes.)

We claim:

1. Signal analyzing apparatus for time sequential electronic signals comprising:

a. a plurality of light emitting diodes positioned in line relationship;

b. a photo-sensitive medium responsive to the said light emitting diodes;

c. means for moving the said photo-sensitive medium, in contacting relationship, past the line of light emitting diodes in a direction substantially at a right angle to the line of light emitting diodes, at a manually controllable variable velocity;

d. an amplifier having manually controllable variable amplification, amplifying the said time sequential signals and providing a first output and a second output;

e. means including a scanner cooperating with the said first output of the amplifier for sequentially scanning the said first output over the said line of light emitting diodes;

f. means cooperating with the said scanner for manually controlling the said scanning rate;

g. a trigger pulse generator cooperating with the said second output of the said amplifier providing a trigger pulse output responsive to manually selectable amplitude levels of the said time sequential signal;

h. means responsive to the said trigger pulse cooperating with the said scanner for automatically synchronizing the scanning rate of the said scanner responsive to the said trigger pulse; and i. means for manually selecting either the said manually controlled scanning rate or the said automatically synchronized scanning rate.

2. The said signal analyzing apparatus as claimed in claim 1 wherein the said scanner includes means for placing the same signal on the first light emitting diode and last light emitting diode in the said line of light emitting diodes.

* * * * *

UNITED STATES PATENT OFFICE
CERTIFICATE OF CORRECTION

Patent No. 3,803,631      Dated 9 April 1974

Inventor(s) James E. Nuckols and Earl V. Eichenlaub

It is certified that error appears in the above-identified patent and that said Letters Patent are hereby corrected as shown below:

In the cover page paragraph after "[76] Inventors:" correct spelling of last name of first inventor from "Nucklos" to --- Nuckols ---.

Signed and sealed this 27th day of August 1974.

(SEAL)
Attest:

McCOY M. GIBSON, JR.
Attesting Officer

C. MARSHALL DANN
Commissioner of Patents